Figures 1A, 1B:
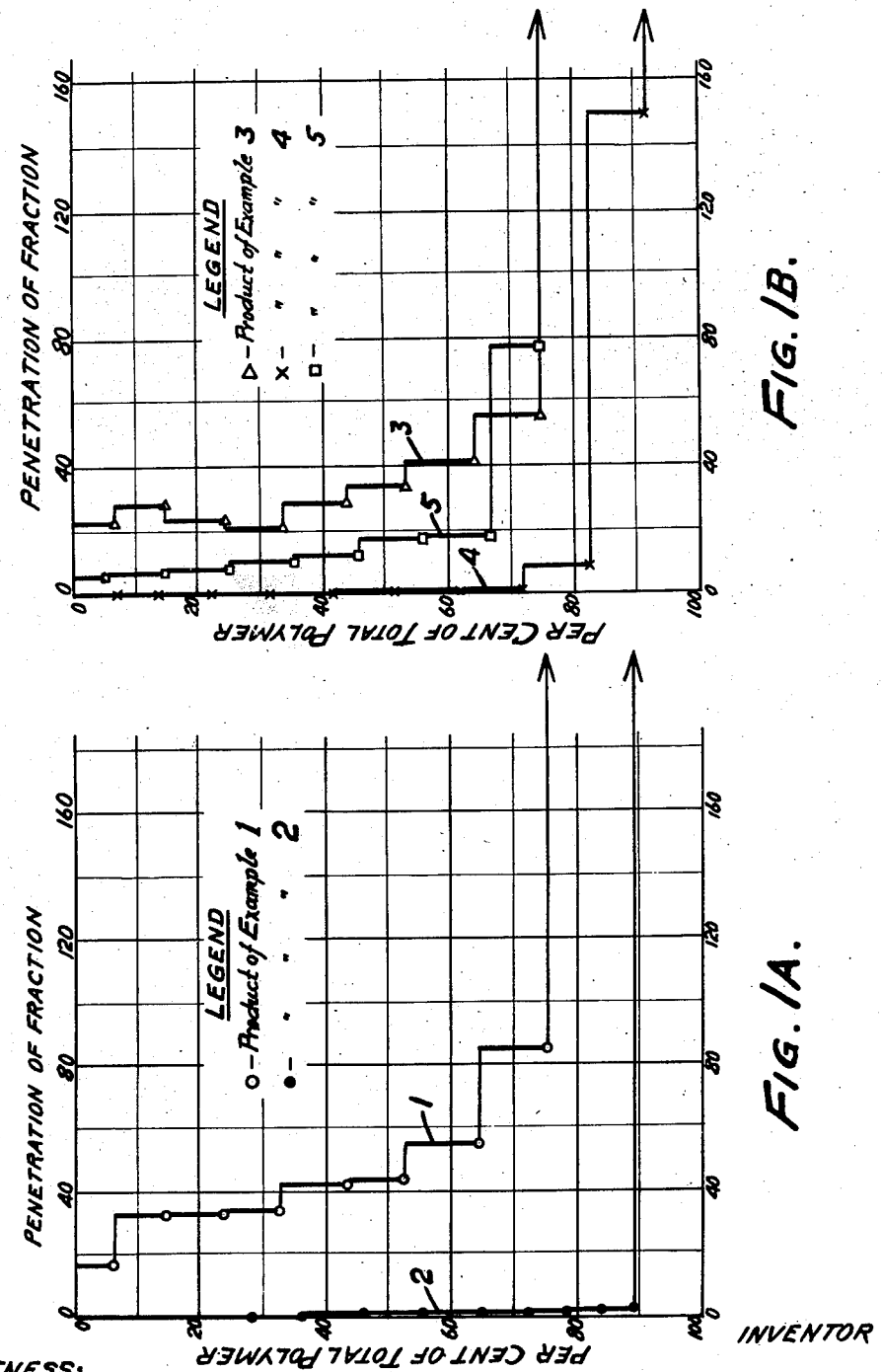

June 27, 1950 S. S. KURTZ, JR 2,513,183
COPOLYMER PRODUCTS
Filed Feb. 9, 1945 2 Sheets-Sheet 1

WITNESS:

INVENTOR
Stewart S. Kurtz, Jr.
BY
ATTORNEYS.

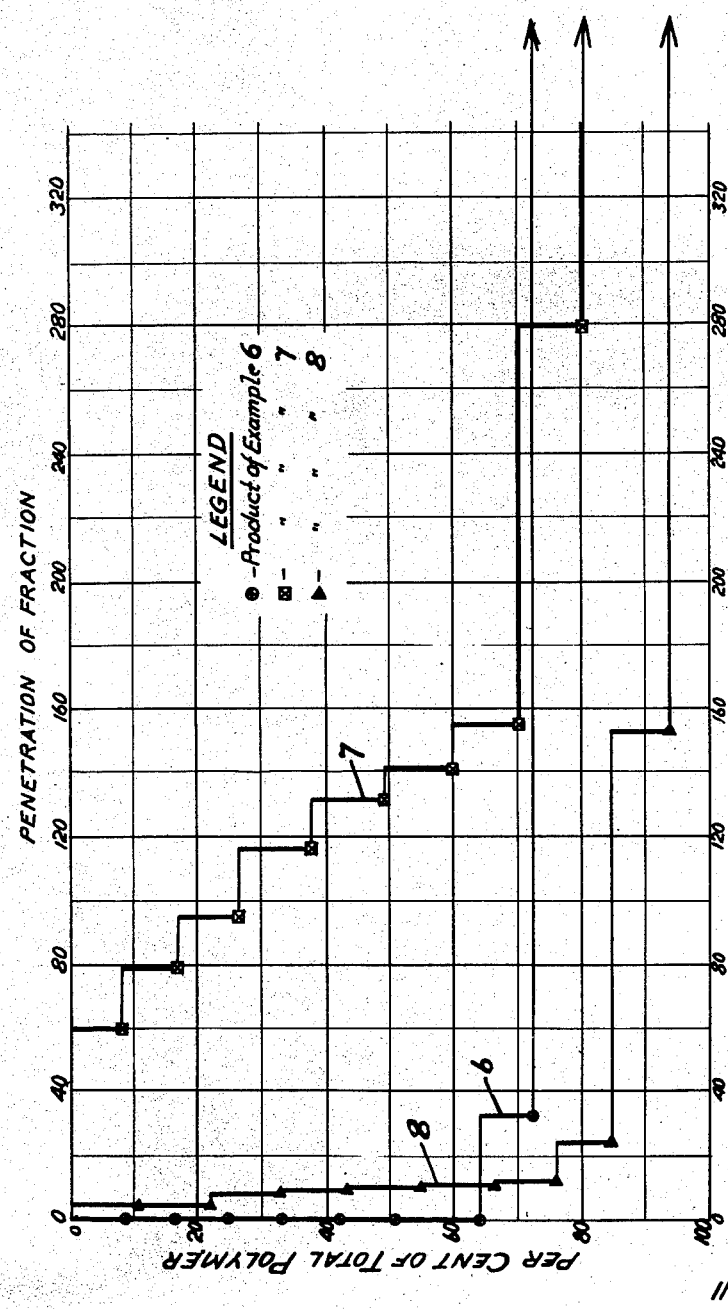

Patented June 27, 1950

2,513,183

UNITED STATES PATENT OFFICE 2,513,183

COPOLYMER PRODUCTS

Stewart S. Kurtz, Jr., Merion, Pa., assignor to Sun Oil Company, Philadelphia, Pa., a corporation of New Jersey Application February 9, 1945, Serial No. 577,118

2 Claims. (Cl. 260—45.5)

The present invention relates to low temperature polymerization products and particularly to polymeric materials comprising, as essential monomeric ingredients, an iso-olefin, a conjugated diolefin and a vinyl substituted aryl compound. More particularly, the invention concerns polymeric products of the aforesaid type which are substantially free of material differing markedly in physical properties from the main bulk of the product.

In copending applications of the present inventor, Serial No. 487,817, filed May 20, 1943, now abandoned, and its continuation-in-part application Serial No. 596,099, filed May 26, 1945, now U. S. Patent 2,497,458, the preparation of copolymers comprising, as monomeric constituents thereof, an iso-olefin such as isobutylene, a conjugated diolefin such as butadiene or isoprene, and a vinyl substituted aryl compound such as styrene, is described in detail. These copolymers may be prepared by polymerizing a mixture of the monomers, generally at a sub-zero centigrade temperature although, under certain conditions, higher temperatures also are operable, by means of a catalyst of the Friedel-Crafts type such as $AlCl_3$ or $BF_3$. By varying the proportions of monomers and the reaction conditions, a wide variety of products differing in properties may be prepared. Under suitable polymerizing conditions, products which are rubber-like and inherently possess the property of tack or products which develop tack upon milling together with other rubbers may be formed, and it has been found that these products are particularly useful as a tackifier for copolymers of the butadiene-styrene type formed by the well-known emulsion polymerization method and commonly called Buna-S rubber. The products are especially advantageous for this purpose since, in addition to having tack-producing qualities, their compatibility characteristics may be controlled as desired to yield a tackifier suitable for compounding with any particular Buna-S type of stock. Thus, by regulating the proportion of the conjugated diolefin, the degree of unsaturation may be adjusted so that the product will be compatible with the Buna-S rubber in respect of rate of cure. This is believed to be desirable in order that, on vulcanizing the blend of the butadiene-styrene polymers and the tackifier, one of the polymers will not become scorched before the other has been sufficiently cured. Further, by regulating the proportion of the vinyl substituted aryl compound used in preparing the tackifier, the aromatic ring content may be controlled so that the product will be compatible with the butadiene-styrene polymers in respect of physical homogeneity on curing therewith. This is of importance in preventing so-called "blooming" of the cured blend.

It has now been found that copolymers prepared as described in the aforesaid application contain a substantial proportion, generally of the order of 10–30 per cent, of material which is markedly softer than the main bulk of the product. This material in some cases may even be an oily fluid, although the entire polymer product may be of rubbery character or even relatively hard and resinous. This softer fraction is made up of copolymers of distinctly lower molecular weight than the harder portion of the product. By way of example, one product formed by polymerizing isobutylene, butadiene and styrene in the proportions of 5:3:2 at a temperature of —78° C. was found to be composed of about 85 per cent of polymers having a penetration varying from 4 to 25 (ASTM Method D–5–25) and about 15 per cent of soft polymers having an average penetration above 800. Again, another product formed at —42° C. from the above-named monomers in the ratio of 4:4:2 and in the presence of 4 parts of normal butylenes was found to be composed of about 89 per cent of polymers having a penetration varying from 0 to 3 and about 11 per cent of soft polymers having an average penetration above 1000. Still another product prepared from these monomers in the ratio of 2:4:4 at —42° C. consisted of about 74 per cent of polymers having a penetration varying from 6 to 78 and about 26 per cent of soft polymers having an average penetration above 1000.

According to the present invention, novel polymeric products are provided by obtaining relatively hard polymers in a state substantially free of markedly softer polymers or at least in a state containing no more than an insignificant proportion of the softer polymers. These novel products are composed of copolymers exhibiting greatly reduced variation in penetration throughout the molecular weight range. The products are characterized by an average penetration (according to ASTM Method D-5-25) less than 200 and further in that the portion thereof representing the 10 per cent of material of lowest molecular weight has a penetration less than 300 units higher than the penetration of that portion thereof representing the 10 per cent of material of highest molecular weight. They thus differ from the copolymers heretofore prepared in that they possess what may be considered a degree of relative uniformity, as characterized by the aforestated maximum difference of 300 units in penetration. The products falling within this classification, however, include substances of a hard resinous character as well as tacky rubber-like materials, and these products may differ widely among themselves in degree of unsaturation and aromatic ring content, depending on the proportions of monomers used in their preparation.

I have found that the novel hard polymer products are distinctly superior to products which include the soft polymers as a tackifier for Buna-S rubber. While the soft polymer-containing product is capable of imparting desired tack properties when compounded with Buna-S rubber along with the other usual additives such as accelerators, softeners, fillers, etc., the soft polymers therein render the compound sufficiently sticky to cause difficulty during the processing operations. For example, considerable difficulty may be encountered during the milling operation due to excessive adherence of the batch to the mill rolls. An even greater drawback in using the soft polymer-containing product, however, occurs in the calendering operation wherein the compound is calendered or frictioned into fabric such as the cord fabric used in the manufacture of tire carcasses. Due to the higher temperatures required in this operation, the effect of the soft polymers becomes extremely troublesome, resulting in sticking of the compound to the calender as well as to the fabric so that a uniform application of the compound to the fabric is not obtained. The products of the present invention, however, have distinctly improved processing characteristics. They impart the tack necessary for adhesion of the compound to fabric without causing undue adherence to the mill rolls or to the calender. Furthermore, the compound after curing appears to have better physical characteristics, such as tensile strength, modulus and elongation, than when the polymers used as tackifier include the soft fraction. The amount of the hard polymer product to add for tackifying purposes will depend to some extent on the particular butadiene-styrene copolymer being processed and on the particular tackifier product used, but in general a minor proportion, such as 5-30 parts to 95-70 parts of the Buna-S rubber, will impart the desired tackifying effect and, at the same time, result in improved mill and calender behavior of the compounded blend.

In order to obtain the novel product of the present invention, one method which may be employed comprises polymerizing the monomers in the usual manner to obtain the usual product and than fractionating this product with respect to molecular weight to separate higher molecular weight polymers as the desired product. This fractionation may be carried out in any suitable manner, for example, by fractional precipitation or fractional solution. However, one particularly suitable means of fractionating involves selective adsorption of the polymers by means of silica gel. This procedure, which is described and claimed in the copending application of John R. Skeen, Serial No. 577,144, filed of even date herewith, now U. S. Patent 2,462,564, briefly comprises dissolving the polymers in a saturated hydrocarbon such as pentane or the like and percolating the solution through a bed of silica gel. It has been found that the lower molecular weight polymers are selectively adsorbed whereas the higher molecular weight polymers tend to remain in solution and pass out with the pentane. By cutting the filtrate into fractions and removing the solvent from each fraction, a series of polymer products ranging in molecular weight from relatively high to relatively low values may be obtained. The lower molecular weight polymers adsorbed by the gel may be desorbed therefrom by means of a desorbing liquid such as benzene. This desorption further fractionates according to molecular weight since the higher molecular weight polymers are most readily removable. The benzene filtrate may be segregated into cuts, if desired, in order to obtain a further series of polymer fractions of decreasing molecular weight.

It is possible to prepare the novel hard polymer products directly by polymerization. This has not heretofore been done, although in known methods of polymerization various reaction conditions have been used. I have discovered, however, that by such known methods, modified by careful regulation of operative conditions, the production of the novel hard polymer products by polymerization without resort to subsequent fractionation, is practicable.

The accompanying drawings shown graphically the penetrations of several series of polymer fractions obtained by fractionating by means of silica gel a number of polymer products formed by polymerization of the specified monomers under various reaction conditions. The plots in the drawings are based on data given in Examples I—VIII set forth hereinbelow, Fig. 1—A representing Examples I and II, Fig. 1—B representing Examples III, IV and V and Fig. 1—C representing Examples VI, VII and VIII. It is to be noted that in each of these examples the total polymerization product contained a major proportion of relatively high molecular weight polymers varying in penetration only to relatively small degree and a minor but substantial proportion of relatively low molecular weight polymers having a penetration markedly higher than that of the major part of the product.

In the following examples the proportions are given on a weight basis unless otherwise specified:

*Example I*

A mixture of monomers comprising 4 parts of isobutylene, 4 parts butadiene and 2 parts styrene, together with 12 parts of normal butylenes, was reacted at about −42° C. in the presence of a large proportion of saturated $C_3$ and $C_4$ hydrocarbons serving as a diluent-refrigerant. The catalyst was a 2½ per cent solution of $AlCl_3$ dissolved in ethyl chloride and a total of 0.4 part $AlCl_3$ was used. After the reaction had stopped, the copolymer product was obtained by deactivating the catalyst and removing the low boiling materials by evaporation. A yield of 9.0 parts of product having a penetration of 144 was obtained.

The product was dissolved in pentane in the proportion of 200 grams to 750 ml. pentane and the solution was percolated through a 2-inch column packed to a height of 22 inches with 28–200 mesh silica gel. The polymer solution was immediately followed by 1000 ml. of benzene to desorb the polymers which had been retained by the gel. The filtrate was collected into consecutive fractions and the solvent was removed from each, thereby yielding a series of polymer fractions of progressively lower molecular weight. The yields based on the total polymer and the penetrations of the fractions were as follows:

| Fraction No. | Yield of fraction, percent on total polymer | Penetration |
|---|---|---|
| 1 | 6.1 | 17 |
| 2 | 8.3 | 33 |
| 3 | 9.0 | 34 |
| 4 | 9.2 | 36 |
| 5 | 10.7 | 43 |
| 6 | 9.6 | 45 |
| 7 | 11.3 | 56 |
| 8 | 11.1 | 86 |
| 9 | 9.5 | [1] 1,300 |
| 10 | 13.7 | [1] 3,500 |
| Total | 98.5 | |

[1] Approximate values.

It is evident from the above data that fractions 9 and 10 have greatly different physical properties from the other fractions and that the elimination of these soft fractions results in a novel product which is relatively uniform in comparison to the total polymer. Each of fractions 1–8 or any combination of these fractions, when used as a tackifier, has distinctly improved processing characteristics as compared to the total polymer product.

Example II

Another polymerization product was prepared under conditions described in Example I except that only 4 parts of normal butylenes were used in the reaction mixture. A yield of 10.0 parts of product having a penetration of 1 was obtained. The product was separated into fractions as in Example I, but in this case 28.3 per cent of the product was insoluble in pentane. This insoluble portion, which was obtained in granular form, represented the polymers of highest molecular weight and was designated as fraction No. 1. Yields and penetrations were as follows:

| Fraction No. | Yield of fraction, percent on total polymer | Penetration |
|---|---|---|
| 1 | [1] 28.3 | [2] 0 |
| 2 | 8.5 | 0 |
| 3 | 9.4 | 1 |
| 4 | 9.5 | 1 |
| 5 | 9.0 | 1 |
| 6 | 7.7 | 1 |
| 7 | 6.3 | 2 |
| 8 | 5.4 | 3 |
| 9 | 5.0 | 3 |
| 10 | 4.4 | [3] 720 |
| 11 | 6.5 | [3] 1,500 |
| Total | 100.0 | |

[1] Insoluble.
[2] Granular.
[3] Approximate values.

In this case the same type of results were obtained as in the previous example and the marked difference between the higher and lower molecular weight portions of the total polymer product is even more strikingly demonstrated.

Example III

The reaction was carried out as in Example I except that 8 parts of normal butylenes and only 0.2 part of AlCl₃ were used. The product, which amounted to 6.0 parts having a penetration of 103, was fractionated as in Example I, with the following results:

| Fraction No. | Yield of fraction, percent on total polymer | Penetration |
|---|---|---|
| 1 | 6.4 | 22 |
| 2 | 8.5 | 23 |
| 3 | 9.0 | 23 |
| 4 | 9.5 | 21 |
| 5 | 10.0 | 29 |
| 6 | 9.7 | 34 |
| 7 | 10.6 | 41 |
| 8 | 10.7 | 56 |
| 9 | 5.3 | [1] 760 |
| 10 | 20.3 | [1] 900 |
| Total | 100.0 | |

[1] Approximate values.

In this example as in the previous examples, any of the higher molecular weight fractions (fraction Nos. 1–8) or any combination of these fractions represents a novel product having a degree of relative uniformity not heretofore obtained in polymers of this type.

Example IV

The reaction product, which was prepared under conditions duplicating those of Example III except that 0.8 part of AlCl₃ was used and which amounted to 11.4 parts having a penetration of 17, was fractionated as in previous examples. Fraction No. 1, amounting to 6.6 per cent of the product, was insoluble in the pentane.

| Fraction No. | Yield of fraction, percent on total polymer | Penetration |
|---|---|---|
| 1 | [1] 6.6 | [2] 0 |
| 2 | 6.3 | 0 |
| 3 | 8.8 | 0 |
| 4 | 9.4 | 0 |
| 5 | 9.8 | 0 |
| 6 | 10.1 | 1 |
| 7 | 10.2 | 1 |
| 8 | 10.2 | 1 |
| 9 | 10.5 | 8 |
| 10 | 9.5 | 151 |
| 11 | 8.6 | [3] 830 |
| Total | 100.0 | |

[1] Insoluble.
[2] Granular.
[3] Approximate value.

Example V

A reaction mixture, comprising 4 parts isobutylene, 2 parts butadiene, 4 parts styrene and 8 parts normal butylenes and containing 30 parts saturated C₄ hydrocarbons as diluent, was polymerized at about −10° C. by adding 0.8 part of AlCl₃ as a powder. The product, which amounted to 10.4 parts with a penetration of 62, was fractionated as in previous examples, with the following results:

| Fraction No. | Yield of fraction, percent on total polymer | Penetration |
|---|---|---|
| 1 | 5.5 | 6 |
| 2 | 9.6 | 7 |
| 3 | 10.1 | 8 |
| 4 | 10.2 | 10 |
| 5 | 10.2 | 12 |
| 6 | 10.5 | 18 |
| 7 | 10.6 | 19 |
| 8 | 7.7 | 78 |
| 9 | 8.0 | [1] 890 |
| 10 | 17.6 | [1] 1,400 |
| Total | 100.0 | |

[1] Approximate values.

Example VI

Two parts isobutylene, 4 parts butadiene and 4 parts styrene were diluted with 60 parts propane and polymerized at about −42° C. by means of gaseous $BF_3$, thereby yielding 9.8 parts of product having a penetration of 22. The product was fractionated by means of silica gel in the manner described above.

| Fraction No. | Yield of fraction, percent on total polymer | Penetration |
|---|---|---|
| 1 | 8.7 | 0 |
| 2 | 7.9 | 0 |
| 3 | 8.3 | 0 |
| 4 | 8.4 | 0 |
| 5 | 8.8 | 0 |
| 6 | 8.8 | 0 |
| 7 | 13.5 | 0 |
| 8 | 8.3 | 33 |
| 9 | 11.1 | [1] 3,000 |
| 10 | 16.0 | [1] 4,200 |
| Total | 99.8 | |

[1] Approximate values.

Example VII

A reaction mixture, comprising 5 parts isobutylene, 3 parts butadiene, 2 parts styrene and 5 parts normal butylenes and containing 60 parts propane and 38 parts saturated $C_4$ hydrocarbons as diluents, was polymerized by means of gaseous $BF_3$ at about −78° C. The product, consisting of 11.6 parts having a penetration of 167, was fractionated as previously described.

| Fraction No. | Yield of fraction, percent on total polymer | Penetration |
|---|---|---|
| 1 | 8.5 | 60 |
| 2 | 8.9 | 79 |
| 3 | 9.6 | 95 |
| 4 | 11.3 | 117 |
| 5 | 10.9 | 132 |
| 6 | 11.1 | 142 |
| 7 | 10.2 | 156 |
| 8 | 10.1 | 280 |
| 9 | 10.9 | [1] 2,800 |
| 10 | 8.5 | (oily fluid) |
| Total | 100.0 | |

[1] Approximate value.

Although the total product was of tacky, rubbery character, fraction 10 was of sufficiently low molecular weight to be fluid and oily.

Example VIII

Five parts isobutylene, 3 parts butadiene and 2 parts styrene were diluted with 60 parts n-pentane and polymerized at about −78° C. by means of gaseous $BF_3$. The product, which amounted to 9.8 parts with a penetration of 21, was fractionated as before.

| Fraction No. | Yield of fraction, percent on total polymer | Penetration |
|---|---|---|
| 1 | 10.7 | 4 |
| 2 | 10.9 | 4 |
| 3 | 11.1 | 8 |
| 4 | 10.4 | 9 |
| 5 | 11.8 | 10 |
| 6 | 11.2 | 11 |
| 7 | 9.7 | 13 |
| 8 | 8.8 | 25 |
| 9 | 8.9 | 153 |
| 10 | 6.5 | [1] 1,600 |
| Total | 100.0 | |

[1] Approximate value.

Example IX

A polymer product was prepared in a manner heretofore described in the art by dissolving 70 parts of isobutylene, 20 parts of butadiene and 10 parts of styrene in 100 parts of propane and polymerizing the mixture at about −42° C. for 4 hours by means of $BF_3$. Ninety-seven parts of product having an average penetration of approximately 900 were obtained. This product was fractionated by means of silica gel as in previous examples. The highest molecular weight fraction, representing the first 8.5 per cent of the total polymer, was found to have a penetration of about 360, while one of the later fractions representing the 81.4–89.9 per cent cut of the total polymer had a penetration greater than 1500. These results show that neither the known polymer product nor any of the fractions separated therefrom would conform to the products of the present invention. The product, as well as any of its fractions, when used as a tackifier for Buna-S rubber is unsatisfactory due to its poor processing characteristics resulting from the soft, sticky nature of the material.

Example X

This example illustrates the type of results obtained in using products of the present invention for tackifying purposes.

A polymer product having a penetration of 82, obtained by polymerizing 40 parts isobutylene, 40 parts butadiene and 20 parts styrene at about −35° C. to −40° C. by means of $AlCl_3$ in ethyl chloride, was separated by means of silica gel into a relatively high molecular weight fraction having an average penetration of 30 and a relatively low molecular weight fraction resembling a viscous oil. On subjecting a sample of the high molecular weight fraction to treatment with silica gel in the manner described in Example I, it was found that the fraction consisted of polymers ranging in penetration from about 7 to about 170. Ten parts of this high molecular weight fraction were added to 90 parts of Buna–S rubber together with the usual additives such as accelerator, activator, filler, anti-oxidant, etc. and the batch was compounded and processed in ordinary factory equipment. No difficulty was encountered in the milling and calendering operations. Furthermore, in a subsequent operation wherein tire carcasses were built from the calendered material, it was found that the compound had the necessary tack required for satisfactory building of the carcass without the aid of cementing agents such as natural rubber cement. By way of comparison, when the Buna-S rubber is processed without the addition of a tackifier, it is impossible to carry out the tire building operation unless a cementing agent is employed. Further, when the total polymer product including the soft fraction is used as tackifier, considerable difficulties are apt to be encountered during milling and particularly in the calendering operation due to excessive stickiness of the blend.

As may be seen from the above examples, the proportions of monomers to use in preparing the present tacky elastic tackifier copolymer may be varied, but in general should be as follows: From about 20 to about 50 parts by weight of an iso-mono-olefin of 4 to 6 carbon atoms having a double bond in the alpha position and a side chain in the beta position, such as isobutylene; from about 20 to about 40 parts by weight of an aliphatic 1,3- conjugated diolefin having from 4 to 6 carbon atoms per molecule, such as butadiene; and from about 20 to about 40 parts by weight of a vinyl substituted aryl compound, such as styrene. The preferred temperature range to employ, as is shown by the examples, is from about −10° C. to about −78° C.

In the above description of the invention, isobutylene, butadiene and styrene have been taken as preferred examples of the three types of monomers employed. However, it is to be clearly understood that the invention may be practiced with other specific monomers of the types concerned. Any iso-olefin of 4–6 carbon atoms having a double bond in the alpha position and a side chain in the beta position will be satisfactory. As the conjugated diolefin, isoprene is another excellent example. Other aliphatic diolefins or compounds which are conjugated in the 1,3 positions are satisfactory, specific examples being piperylene, conjugated hexadienes and 2-chlorobutadiene. Styrene has been taken as representative of the third type of monomer although other vinyl-substituted aryl compounds (i. e. compounds containing an aryl group conjugate to the vinyl group) may be used. Other specific examples of this type of monomer are methyl styrenes, ethyl styrenes, dimethyl styrenes, diethyl styrenes, vinyl naphthalene or the like.

What I claim and desire to protect by Letters Patent is:

1. A composition of matter comprising a mixture of a preponderant proportion of a synthetic rubber, made by polymerization of a mixture comprising butadiene and styrene, and a minor portion, effective to impart tack thereto, of a tacky elastic tackifier copolymer product having an average penetration of less than 200, and being characterized in that the portion thereof representing the 10 per cent of material of lowest molecular weight has a penetration less than 300 units higher than the penetration of that portion representing the 10 per cent of material of highest molecular weight, derived by polymerization, at a temperature of from about −10° C. to about −78° C. with the aid of a Friedel-Crafts type catalyst, of a monomeric mixture comprising from about 20 to about 50 parts by weight of isobutylene, 20 to about 40 parts by weight butadiene, and from about 20 to about 40 parts by weight styrene, and fractionating the resulting copolymer to remove polymers of low molecular weight.

2. A composition of matter comprising a mixture of a preponderant proportion of a synthetic rubber, made by polymerization of a mixture comprising butadiene and styrene, and a minor portion, effective to impart tack thereto, of a tacky elastic tackifier copolymer product derived by polymerization, at a temperature of from about −10° C. to about −78° C. with the aid of a Friedel-Crafts type catalyst, of a monomeric mixture comprising from about 20 to about 50 parts by weight of an iso-mono-olefin of 4–6 carbon atoms having a double bond in the alpha position and a side chain in the beta position, from about 20 to about 40 parts by weight of an aliphatic 1,3- conjugated diolefin having from 4 to 6 carbon atoms per molecule, and from about 20 to about 40 parts by weight of a vinyl substituted aryl compound selected from the group consisting of styrene, methyl styrenes, ethyl styrenes, dimethyl styrenes, diethyl styrenes, and vinyl naphthalene, and fractionating the resulting copolymer to remove polymers of high penetration, said tacky elastic tackifier copolymer having an average penetration of less than 200 and being characterized in that the portion thereof representing the 10 per cent of material of lowest molecular weight has a penetration less than 300 units higher than the penetration of that portion representing the 10 per cent of material of highest molecular weight.

STEWART S. KURTZ, Jr.

REFERENCES CITED

The following references are of record in the file of this patent:

UNITED STATES PATENTS

| Number | Name | Date |
|---|---|---|
| 2,039,367 | Thomas | May 5, 1936 |
| 2,381,267 | Drake | Aug. 7, 1945 |
| 2,398,976 | Thomas | Apr. 23, 1946 |
| 2,438,340 | Johnson | Mar. 23, 1948 |

FOREIGN PATENTS

| Number | Country | Date |
|---|---|---|
| 106,371 | Australia | Jan. 26, 1939 |

OTHER REFERENCES

Sebrell, pages 736, 740 and 741, Ind. & Eng. Chem., July 1943.